US006237096B1

(12) United States Patent
Bisbee et al.

(10) Patent No.: US 6,237,096 B1
(45) Date of Patent: *May 22, 2001

(54) SYSTEM AND METHOD FOR ELECTRONIC TRANSMISSION STORAGE AND RETRIEVAL OF AUTHENTICATED DOCUMENTS

(75) Inventors: Stephen F. Bisbee, Glyndon; Jack J. Moskowitz, Ellicott City; Douglas H. Trotter; Michael W. White, both of Baltimore, all of MD (US)

(73) Assignee: eOriginal Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/072,079

(22) Filed: May 4, 1998

Related U.S. Application Data

(63) Continuation-in-part of application No. 08/528,841, filed on Sep. 15, 1995, now Pat. No. 5,748,738, which is a continuation-in-part of application No. 08/373,944, filed on Jan. 17, 1995, now Pat. No. 5,615,268.

(51) Int. Cl.[7] .......................................................... H04L 9/00

(52) U.S. Cl. ............................. 713/178; 713/176; 705/51

(58) Field of Search ...................... 705/51, 59; 713/176, 713/178

(56) References Cited

U.S. PATENT DOCUMENTS

| Re. 34,954 | 5/1995 | Haber et al. . |
|---|---|---|
| 4,200,770 | 4/1980 | Hellman et al. . |
| 4,405,829 | 9/1983 | Rivest et al. . |

(List continued on next page.)

FOREIGN PATENT DOCUMENTS

| 97 12460 | 4/1997 | (WO) . |

OTHER PUBLICATIONS

O'Mahnoy, Donal, Michael Peirce, Hitesh Tewari, Electronic Payment Systems, 1997, pp. 101–123.*

Schneier, Bruce, Applied Cryptography, 1996, pp. 185–187 and 574–577.*

Dekleermaeker, L., "The Validity of Electronic Communication", Klewer Dedrijfswetenschappen, Netherlands, vol. 38, pp. 38–41, Apr. 1996.

Ingram, Peter, "Message Handling Systems: Message Transfer System: Abstract Service Definition and Procedures", Version 4, Geneva, pp. 51–56, Jun. 1987.

Kent, S. et al. "Privacy Enhancement for Internet Electronic Mail: Part II Certificate Based Key Management", Obsoleted by RFC1422 Archive, IAB Privacy Task Force, Aug. 1989.

(List continued on next page.)

Primary Examiner—Todd Swann
Assistant Examiner—Douglas Meislahn
(74) Attorney, Agent, or Firm—Burns, Doane, Swecker & Mathis, LLP

(57) ABSTRACT

Methods and apparatus are provided that implement digital signing and/or encryption for the electronic transmission, storage, and retrieval of authenticated documents and that enable the establishment of the identity of the originator of an electronic document and of the integrity of the information contained in such a document. Together these provide irrevocable proof of authenticity of the document. The methods and apparatus make it possible to provide "paperless" commercial transactions, such as real-estate transactions and the financial transactions secured by real estate. A Certification Authority provides tools for initializing and managing the cryptographic material required to sign and seal electronic documents. An Authentication Center provides "third party" verification that a document is executed and transmitted by the document's originator. The methods and apparatus eliminate the need for "hard copies" of original documents as well as hard-copy storage. Retrieval of an authenticated document from the Authentication Center may be done by any number of authorized parties at any time by on-line capability.

46 Claims, 11 Drawing Sheets

U.S. PATENT DOCUMENTS

| | | |
|---|---|---|
| 4,625,076 | 11/1986 | Okamoto et al. . |
| 4,853,961 | 8/1989 | Pastor . |
| 4,893,338 | 1/1990 | Pastor . |
| 4,981,370 | 1/1991 | Dziewit et al. . |
| 4,995,082 | 2/1991 | Schnorr . |
| 5,005,200 | 4/1991 | Fischer . |
| 5,136,646 | 8/1992 | Haber et al. . |
| 5,136,647 | 8/1992 | Haber et al. . |
| 5,163,091 | 11/1992 | Graziano et al. . |
| 5,164,988 | 11/1992 | Matyas et al. . |
| 5,191,613 | 3/1993 | Graziano et al. . |
| 5,214,703 | 5/1993 | Massey et al. . |
| 5,231,668 | 7/1993 | Kravitz . |
| 5,276,737 | 1/1994 | Micali . |
| 5,315,658 | 5/1994 | Micali . |
| 5,323,146 | 6/1994 | Glaschick . |
| 5,339,361 | 8/1994 | Schwalm et al. . |
| 5,363,448 | 11/1994 | Koopman, Jr. et al. . |
| 5,371,794 | 12/1994 | Diffie et al. . |
| 5,373,561 | 12/1994 | Haber et al. . |
| 5,377,270 | 12/1994 | Koopman, Jr. et al. . |
| 5,390,247 | 2/1995 | Fischer . |
| 5,524,073 | 6/1996 | Stambler . |
| 5,534,855 | 7/1996 | Shockley et al. . |
| 5,555,307 | 9/1996 | Le Corre et al. . |
| 5,615,268 | 3/1997 | Bisbee et al. . |
| 5,699,431 | 12/1997 | Van Oorschot et al. . |
| 5,748,738 | 5/1998 | Bisbee et al. . |
| 5,987,429 * | 11/1999 | Maritzen et al. ...................... 705/31 |
| 6,023,509 * | 2/2000 | Herbert et al. ......................... 380/25 |
| 6,070,239 * | 5/2000 | McManis ............................. 713/187 |

OTHER PUBLICATIONS

Hice, G.F. et al., "DMS Prologue to the Government E-mail Revolution, A Review of the Defense Message System" J.G. Van Kyke and Associates, Inc., pp. 47–70, 1995.

Chaum, David, "Achieving Electronic Privacy", Scientific American, pp. 96–101, Aug. 1992.

Diffie, W., "Privacy and Authentication: An Introduction to Cryptography", Proceeding of the IEEE, vol. 67, No. 3, Mar. 1979.

Diffie, W., "The First Ten Years of Public–Key Cryptography", IEEE, vol. 76, No. 5, pp. 560–577, May 1988.

Hellman, Marin., "The Mathematics of Public–key Cryptography", Aug. 1979.

Merrill, Charles, "Cryptography for Comerce–Beyond Clipper", The Data Law Report, vol. 2, No. 2, Sep. 19, 1994.

Rivest, R.L., "A Method for Obtaining Digital Signatures and Public–Key Cryptosystems", 1978.

Shannon, C.E., "Communication Theory of Secrecy Systems", Bell Sys. Tech. J., vol. 28, pp. 656–715, Oct. 1949.

* cited by examiner

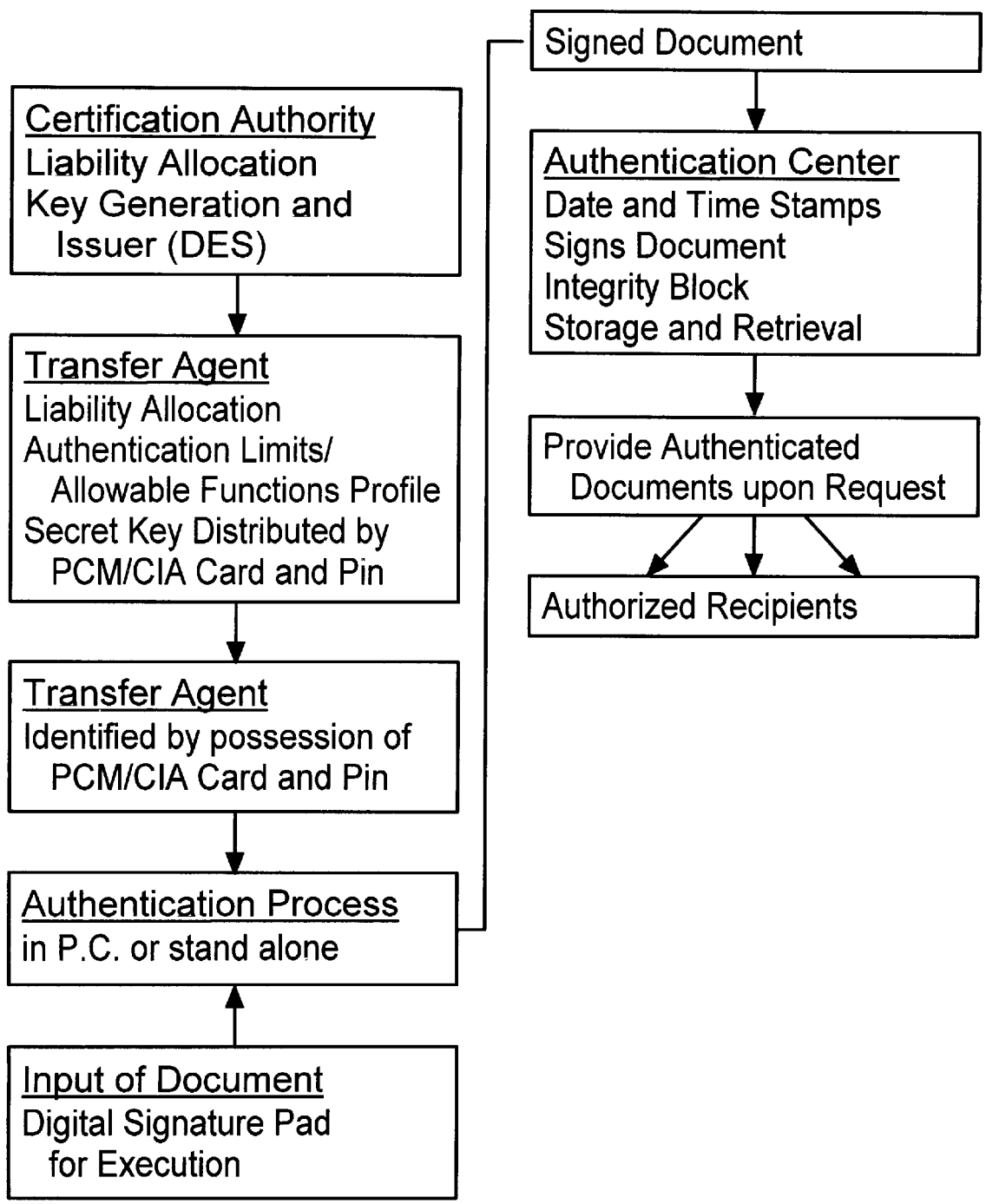

FIG. 2

| PCCard | Terminal Software | DAS Services |
|---|---|---|
| Tamperproof cryptography<br>*Provides cryptographic processing for:*<br>PIN - Card activation & exposure of secret cryptographic materials<br>Key Exchange<br>Key Set Management of encryption, hash, and signature keys<br>*Stores:*<br>Card Characterization Information<br>Certificates & Keys<br>Software macros<br>Attribute tables | Card Resource Manager<br>Participates in Card authentication & Activation<br>Format data & perform I/O operations with Card<br>Requests Card services | PIN validation<br>Compute integrity value<br>Sign<br>Authenticate Signature<br>Validate Integrity<br>Time-Stamp<br>Encrypt/decrypt<br>Manage keys<br>Store Audit Trail & Liability Allocation |

DAS ARCHITECTURE

MPC - Multiport Controller
PCR - PCM/CIA Card Reader
*   - 486/50 Laptop Computers
     may be utilized

FIG. 4

DAS FUNCTIONAL INTERRELATIONSHIP

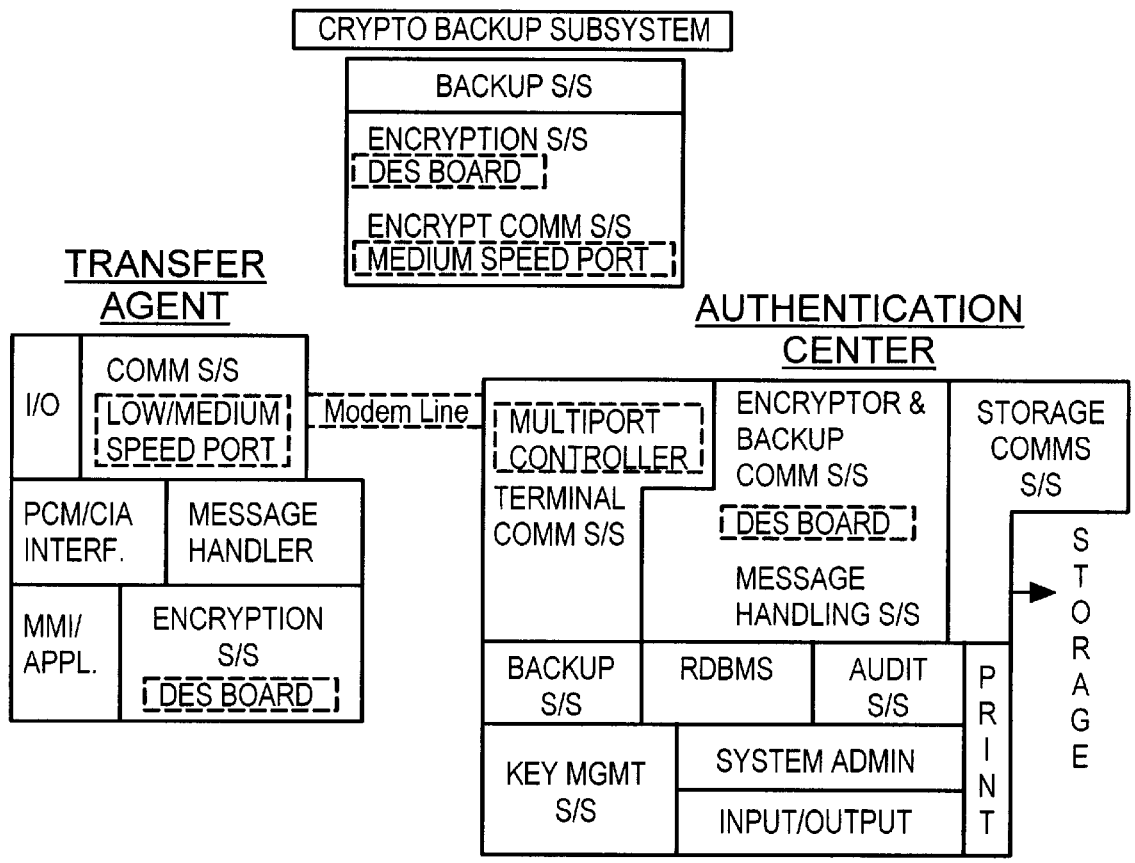

TERMINAL SUBSYSTEM

Terminal: 486/50 PC
MS/DOS
Windows

Running Agent Application with transparent secure communications

SERVER SUBSYSTEM

Server: 486/50 System Pro
UNIX

Built Around Powerful multiuser RDBMS, supporting multiple terminal communications with complete audit and administration Crypto Host: 486/50 PC
MS/DOS
Provides Encryption

FIG. 5

DAS CONTROL FUNCTIONS

| CONTROL FUNCTIONS | | | | |
|---|---|---|---|---|
| Confidentiality | Integrity | Non-repudiation (Signature) | | Management Limits on User |
| | | User | Authentication System | |
| Public key encryption of PIN and Keying Material | Digital Signature provides integrity protection. | Digital sign. of user/ customer "signs" the transactions in a manner that cannot be repudiated. | Digital Sign. of AC "signs" the trans- actions in a manner that cannot be repudiated. | Limits for user profile stored on PCM/ CIA card |
| DES encryption of transactions. | | | Integrity Block | PIN and PCM/ CIA card authentication to terminal and DAS system |
| | | | Date and time stamp | |

DOCUMENT AUTHENTICATION SYSTEM LOAN TRANSACTION

FIG. 6b

DOCUMENT AUTHENTICATION SYSTEM LOAN TRANSACTION

CHART STEPS

Step 1. Complete Certification Authority code generation and card issuing to parties transferring the documents establishing legal evidence trail. Equip parties to transmit and receive documents Step 2. Bank/Mortgage Co. loads and electronically transmits documents to Authentication Center which forwards to Title Co./Closing Agent Step 3. Authentication Center transmits documents to Title Co./Closing Agent Step 4. Title Co./Closing Agent has documents executed by digital siganture by Homebuyer/Homeowner Step 5. Title Co./Closing Agent provides Homeowner/Homebuyer with "Hard Copy" of signed documents Step 6. Title Co./Closing Agent transmits documents to Authentication Center which dates and time stamps the executed documents and forwards documents to Bank/Mortgage Co.
* Whenever Bank/Mortgage Co. needs authentic documents, can retrieve on-line from Authentication Center storage Step 7. Bank/Mortgage Co. directs authentic documents to be transferred by Authentication Authority to secondary market investor Step 8. Whenever investor needs authentic documents, can retrieve on-line from Authentication Center

CARICATURE OF X.509 CERTIFICATE
USER OR CERTIFICATION AUTHORITY

| IDENTITY<br>Name/Organization | ATTRIBUTES<br>Various Priviledges | PUBLIC KEY<br>Decrypt Info | SIGNATURE VALUE<br>Digitally Signed Message Digest of Certificate |
|---|---|---|---|

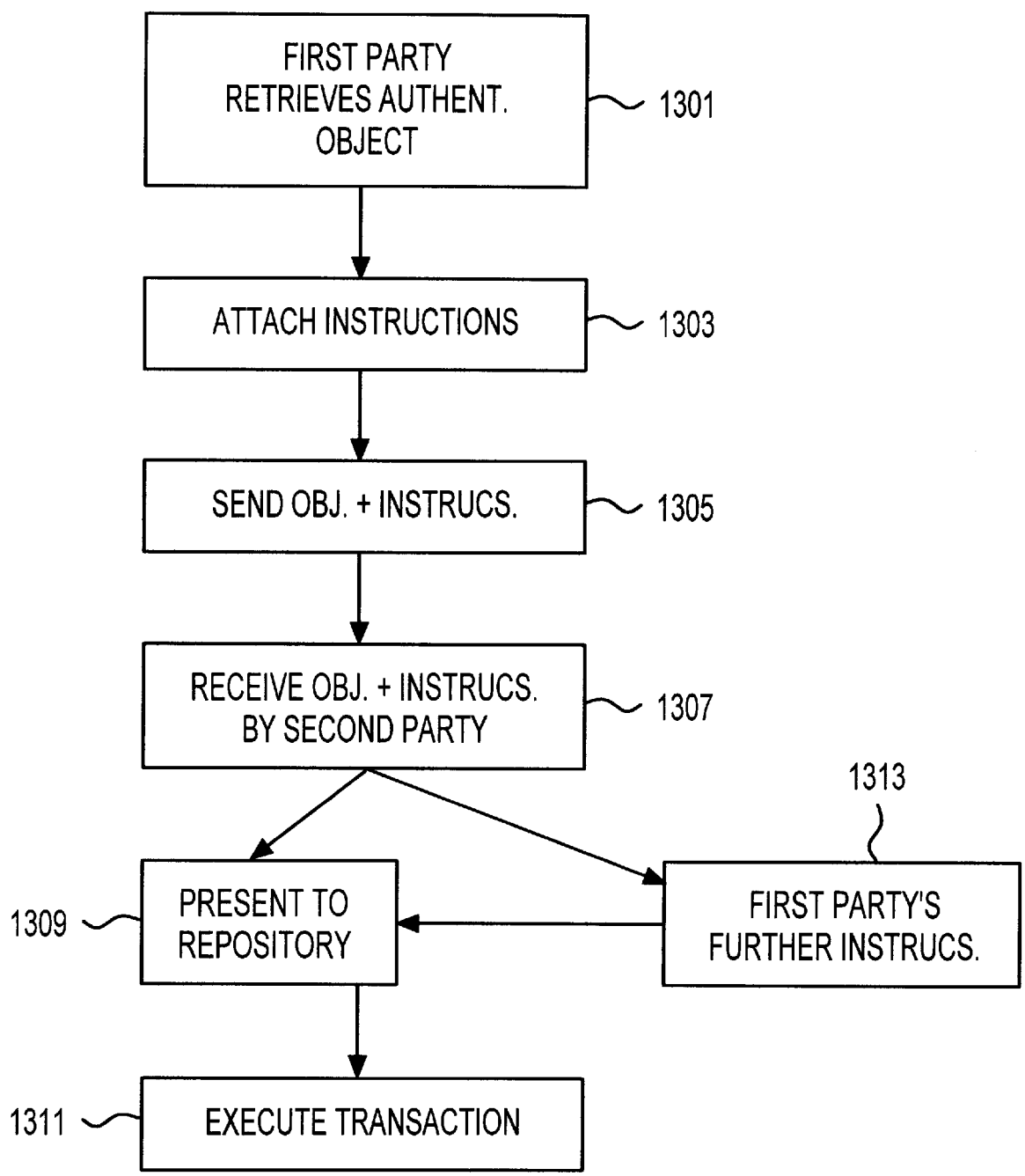

SYSTEM AND METHOD FOR ELECTRONIC TRANSMISSION STORAGE AND RETRIEVAL OF AUTHENTICATED DOCUMENTS

This application is a continuation-in-part of U.S. patent application Ser. No. 08/528,841 filed on Sep. 15, 1995, which is now U.S. Pat. No. 5,748,738, which is a continuation-in-part of U.S. patent application Ser. No. 08/373,944 filed on Jan. 17, 1995, which is now U.S. Pat. No. 5,615,268.

BACKGROUND

Applicant's invention relates to systems and methods for providing a verifiable chain of evidence and security for the transfer and retrieval of documents in digital formats.

Paper documents are the traditional evidence of the communications and agreements between parties in commercial and other transactions. Financial and real-estate transactions are protected by paper-based controls. Signatures and safety paper (such as pre-printed checks) facilitate detection of unauthorized alterations of the information of commercial transactions. Important documents may also be provided with "third man" controls, by the witnessing of signatures and by the seal and acknowledgment of a Notary Public.

The methods of commerce, however, have changed dramatically and continue to evolve. This is most evident in the replacement of paper-based communications with electronic communications. The "due care" controls used with paper-based communications do not exist in routine electronic transactions. Standard electronic communication over open systems does not have the same ability to provide authentication, privacy, and integrity of the communicated information. By "authentication" is meant verification of the identity of the signatory of a document; by "privacy" is meant protection of the information in a document from unauthorized disclosure; and by "integrity" is meant the ability to detect any alteration of the contents of a document.

When communication is by electronically reproduced messages such as e-mail, facsimile machine, imaging, electronic data interchange or electronic fund transfer, there no longer exists a signature or seal to authenticate the identity of the transferor. The traditional legally accepted methods of verifying the identity of a document's originator, such as physical presence or appearance, an ink signature, personal witness or Notary Public acknowledgment, are not possible.

The continued evolution of computer and telecommunications technology has regretfully been accompanied by the invention of more sophisticated ways to intercept and alter information electronically transmitted, including the widespread phenomenon of remote intrusion of computer systems through telecommunication links.

Some approaches to providing secure electronic commerce technology by applying cryptography give the user a verification mechanism for the authenticity or privacy of the transmission that is controlled by the user and does not include the element of non-repudiation. In some cases the use of encryption for privacy could aid in the detection of document alterations, advancing the goal of integrity. This is not generally the case, however, and additional mechanisms may be required for providing integrity. At present, no distributed electronic document authentication system exists that can provide authentication, as with written or printed instruments, in a manner that cannot be repudiated. No commercial system provides electronic document verification based on a digital signature that cannot be repudiated, although some attempts have been described. See, e.g., D. Chaum, "Achieving Electronic Privacy", *Scientific American*, vol. 247, no. 8, pp. 96–101 (August 1992); C. R. Merrill, "Cryptography for Commerce—Beyond Clipper", *The Data Law Report*, vol. 2, no. 2, pp. 1, 4–11 (September 1994). Since DES, no governmental organization or other standards-setting body has been willing or able to set standards (i.e., as to cryptographic strength, process, etc.) acceptable for general commercial use. The techniques described in this application are synergistic and of sufficient assurance to be on par with the security needed to support a typical business transaction.

Applicant's document authentication system (DAS) provides the needed security and protection of electronic transmissions, such as electronic documents. Most important to commercial and financial institutions, Applicant's DAS assumes the risk and responsibility of a document's authenticity. Applicant's DAS utilizes an asymmetric cryptosystem, known as a public-key system, to help ensure that the party originating a document is electronically identifiable as such when a DAS digital signature is applied.

Various aspects of public-key cryptographic (PKC) systems are described in the literature, including R. L. Rivest et al., "A Method for Obtaining Digital Signatures and Public-Key Cryptosystems," *Communications of the ACM* vol. 21, pp. 120–126 (February 1978); M. E. Hellman, "The Mathematics of Public-Key Cryptography", *Scientific American*, vol. 234, no. 8, pp. 146–152, 154–157 (August 1979); and W. Diffie, "The First Ten Years of Public-Key Cryptography", *Proceedings of the IEEE*, vol. 76, pp. 560–577 (May 1988). Popular PKC systems make use of the fact that finding large prime numbers is computationally easy but factoring the products of two large prime numbers is computationally difficult. A PKC system is an asymmetric encryption system, meaning that it employs two keys, one for encryption and one for decryption. Asymmetric systems adhere to the principle that knowledge of one key (the public key) does not permit derivation of the second key (the private key). Thus, PKC permits the user's public key to be posted (e.g., in a directory or on a bulletin board), without compromising his/her private key. This public key concept simplifies the key distribution process. Example PKC algorithms are the digital signature algorithm and secure hash algorithm (DSA/SHA) and RSA/MD5.

Besides the PKC method, another encryption method is the symmetric algorithm. An example of this is the Data Encryption Standard (DES), which is described in *Data Encryption Standard*, Federal Information Processing Standards Publication 46 (1977) ("FIPS PUB 46", republished as FIPS PUB 46-1 (1988)) and *DES Modes of Operation*, FIPS PUB 81 (1980) that are available from the U.S. Department of Commerce. In general, a symmetric cryptographic system is a set of instructions, implemented in either hardware, software or both that can convert plaintext (the unencrypted information) to ciphertext, or vice versa, in a variety of ways, using a specific key that is known to the users but is kept secret from others.

For either a symmetric or PKC system, the security of a message is dependent to a great extent on the length of the key, as described in C. E. Shannon, "Communication Theory of Secrecy Systems", *Bell Sys. Tech. J. vol.* 28, pp. 656–715 (October 1949).

SUMMARY

These and other objects and advantages are provided by the DAS which comprises the means to identify the originator of the electronic document, to provide irrevocable proof of the integrity of an electronic document and the means to prevent the originator of the document from denying the document's originator, i.e., non-repudiation.

In one aspect of Applicants' invention, a method of executing a transaction by transferring authenticated information objects having respective verifiable evidence trails includes the step of retrieving, by a first party from a trusted repository, an authenticated information object. The authenticated information object includes a first digital signature of the first party, a first certificate relating at least an identity and a cryptographic key to the first party, date and time stamps and a certificate applied by the trusted repository, and a digital signature of the trusted repository. The first digital signature and first certificate have been validated by the trusted repository. The certificate relates at least an identity and a cryptographic key to the trusted repository, and the authenticated information object has been stored under the control of the trusted repository.

The method further includes the steps of attaching instructions to the retrieved authenticated object; transmitting the retrieved authenticated object and the attached instructions to a second party; receiving, by the second party, the transmitted retrieved authenticated object and attached instructions; presenting, by the second party to the trusted repository, the received transmitted retrieved authenticated object and attached instructions; and executing the transaction according to the instructions presented to the trusted repository.

The instructions may cause the trusted repository to transfer ownership of the authenticated information object from the first party to the second party, and the trusted repository may validate a digital signature of the second party included with the presented object, apply date and time stamps to the presented object, and sign the stamped presented object with its digital signature. Furthermore, the first party may apply a digital signature to the retrieved authenticated object and the instructions before they are transmitted to the second party. Also, the retrieved authenticated object and the attached instructions may be transmitted by the trusted repository to each of a plurality of second parties in accordance with the attached instructions, which may cause the trusted repository to take at least one of the following actions: accept a first-received response, accept a greatest-value response, accept a response greater than an amount, and accept a response presented before a closing date. The instructions may also provide a syndicated transaction.

In another aspect of Applicants' invention, a method of executing a transaction by transferring authenticated information objects having respective verifiable evidence trails includes the step of retrieving, by a first party from an trusted repository, an authenticated information object. The authenticated information object includes a first digital signature of the first party, a first certificate relating at least an identity and a cryptographic key to the first party, date and time stamps and a certificate applied by the trusted repository, and a digital signature of the trusted repository. The first digital signature and first certificate have been validated by the trusted repository. The certificate relates at least an identity and a cryptographic key to the trusted repository, and the authenticated information object has been stored under the control of the trusted repository.

The method further includes the steps of attaching first instructions to the retrieved authenticated object; transmitting the retrieved authenticated object and the first instructions to a second party; receiving, by the second party, the transmitted retrieved authenticated object and first instructions; communicating, by the second party to the first party, a response to the received transmitted retrieved authenticated object and first instructions; sending second instructions from the first party to the trusted repository; and executing the transaction according to the second instructions.

The instructions may cause the trusted repository to transfer ownership of the authenticated information object from the first party to the second party, and the first party may apply a digital signature to the retrieved authenticated object and the instructions before they are transmitted to the second party. The first and second instructions may provide a syndicated transaction.

BRIEF DESCRIPTION OF THE DRAWINGS

The various features and advantages of Applicant's invention will become apparent by reading this description in conjunction with the drawings in which:

FIG. 1 is a block diagram of the liability allocation for authentication in the DAS;

FIG. 2 summarizes the functions of the DAS relating to document transmission authorization and protection;

FIG. 4 is a block diagram of the functional interrelationship between a Transfer Agent and an Authentication Center;

FIG. 5 is a block diagram of DAS control functions;

FIGS. 6a, 6b are diagrams illustrating application of the DAS in the mortgage finance industry with a title company/closing agent for a loan as a Transfer Agent;

FIG. 13 illustrates exemplary transactions.

DETAILED DESCRIPTION

Figure 3:
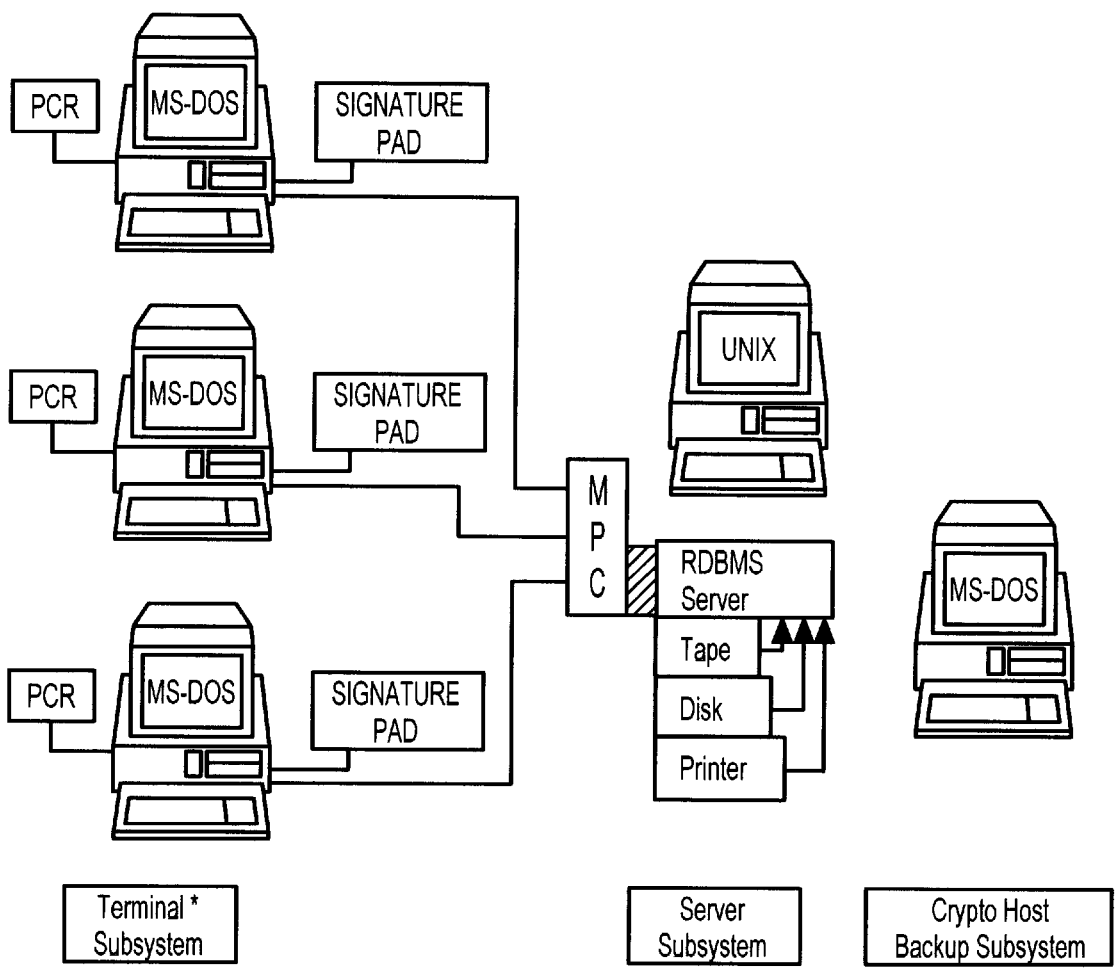
FIG. 3 is a simple diagram of the DAS architecture.

Applicant's invention can be implemented utilizing commercially available computer systems and technology to create an integrated closed system for authentication of electronic documents.

Referring to FIG. 1, which is a block diagram of the liability allocation for authentication in Applicant's DAS, the DAS uses a Certification Authority framework by which public/private keys, that are utilized to encrypt/decrypt and/or digitally sign a document, are delivered to a document's originator by an established, auditable means. Certificates and certification frameworks are described in the above-cited publication by C. R. Merrill and in ITU-T Recommendation X.509 (1993)|ISO/IEC 9594–8:1995 Information Technology—Open Systems Interconnection—The Directory: Authentication Framework (including all amendments), which is expressly incorporated here by reference. The infrastructure and certificate definitions used in this application are based on these documents.

As described below, the public/private key is advantageously delivered in the form of a Token such as an electronic circuit card conforming to the standards of the PC Memory Card Interface Association (a PCMCIA card or PC Card) for use in the originator's computer. In general a Token is a portable transfer device that is used for transporting keys, or parts of keys. It will be understood that PC Cards are just one form of delivery mechanism for public/private keys for Applicant's DAS; other kinds of Tokens may also be used, such as floppy diskettes and Smart Cards. To ensure reliable delivery a service such as the bonded courier services commonly used to ferry securities between parties could be used to deliver the media to the document originator.

Advantageously, many commercially available Tokens that embody on-board cryptography generate the public/private key pairs on the cards, and the private keys never leave the cards unencrypted. The public keys are exported to the Certification Authority for inclusion, with the identity of the intended recipient and appropriate user attributes among other things, into a "certificate". Principal components of the DAS system assurance are the correct operation of the Certification Authority framework, the tight binding of user identity and attributes to the public key in the certificate, and the reliable delivery of the Token to the authorized recipient.

In an additional aspect of Applicant's invention, the public/private key is only effective when it is used in conjunction with a certificate and personal identification information such as the recipient's biometric information (e.g., retina-, finger-, and voice-prints) or a personal identification number (PIN) that is assigned to the recipient of the card by the Certification Authority and that may be delivered separate from the originator's card. Any subsequent transmitter of the document who is required to digitally sign or encrypt the document would similarly be provided with a respective card and personal identification information.

In FIG. 1, a document's originator and any subsequent transmitter are called a Transfer Agent, and it will be appreciated that a Transfer Agent is identified to the DAS by its possession and use of a valid certificate and a valid PIN. In issuing the key and PIN to the Transfer Agent, the DAS advantageously records one or more attributes of the Transfer Agent in association with the key and PIN. For example, the Transfer Agent may be authorized to conduct only certain types of transactions and/or transactions having less than a predetermined value.

Issuance by the Certification Authority of a digitally signed certificate ensures the verifiability of the identity of each transmitter of a digitally signed or encrypted document. The Certification Authority also retains the ability to revoke a public/private key, or to reissue a public/private key, from a remote location electronically. The Certification Authority can also support privilege management in accordance with the policy set for the system. For example, the Certification Authority can set financial or other limits on the authority granted to the Transfer Agent by conveying those authorizations or restrictions as certificate attributes. These attributes can be retrieved from the certificate and enforced by other elements in the system.

In an important aspect of Applicant's invention, the DAS is a system for authenticating a document by applying digital signature encryption technology. As used here, "authentication" is the corroboration and verification of the identity of the party which executed, sealed, or transmitted the original document and verification that the encrypted document received is the document sent by that party. The DAS uses an Authentication Center to provide an audit or evidence trail, for applications that require this capability, from the original execution of the executed or encrypted or sealed document through all subsequent transmissions.

The Certification Authority would use a physically secure facility that is a "trusted center" having twenty-four-hour security, an alarm system, and "vaulted" construction. In view of its importance, a facility would advantageously include two-person controls, with no single person having access to key generating or key management systems. All personnel connected with the operations of cryptographic key management and transmission of electronic documents would have their trustworthiness evaluated in the surest ways possible, e.g., personal interviews, background checks, polygraphs, etc. Moreover, the Certification Authority management would implement procedures that prevent single-point failures, requiring collaboration for compromise to take place. In this way, one individual would be prevented from obtaining complete access to key generation and to key management.

Another aspect of Applicant's DAS authentication that is in contrast to prior systems is the utilization of an integrity block and a date and time "stamp" on each transmitted document. Suitable time and date stamps are those provided by systems described in U.S. Pat. Nos. 5,136,646 and 5,136,647 to Stuart A. Haber and W. S. Stornetta, Jr., both of which are expressly incorporated here by reference, and commercially available from Surety Technologies, Inc. The integrity block, i.e., the digital signature, and the date and time stamp, which are applied by the Authentication Center, eliminate the possibility of unauthorized alteration or tampering with a document by the signatories subsequent to its original execution or sealing. The Authentication Center's integrity block for a document received from a Transfer Agent is generated using any of several known digital hashing algorithms. This integrity block ensures that the document cannot be altered without detection. In addition, use of the digital signing algorithm by the Authentication Center can advantageously provide for non-repudiation, i.e., precluding the originator from disavowing the document. Applicant's combination of the integrity block, date and time stamp, and audit provide notice and evidence of any attempt at alteration or substitution, even by a document's originator when the alteration is attempted after origination.

In accordance with Applicant's invention, each transaction and its documents are authenticated by transmission to the Authentication Center from the Transfer Agent's terminal. As described below, the Transfer Agent provides the document in digital form, such as the output of a conventional word processor, to the Transfer Agent's Token. As an option, a device for digitizing a hand-written signature may also be provided and the digitized signature may be added to the digital document. The digital document is digitally signed and/or encrypted by the DAS Token, and the digitally signed and/or encrypted version is communicated to the Authentication Center electronically (e.g., by modem or computer network). Other ways of communicating the digitally signed or encrypted documents might be used (for example, dispatching a diskette containing the document), but the great advantage of electronic communication is speed.

The Authentication Center verifies the identity of the Transfer Agent and the authenticity of the documents, and appends a digital signature and a date and time stamp to the document, thereby establishing each transaction in a manner which can not be repudiated. The combination of these functions, in conjunction with a protected audit trail, can be used at a future date to prove conclusively that a party initiated a transaction. In particular, Applicant's invention provides for authentication of a document in a way that prohibits an originator from denying that the document originated with that originator, and provides irrevocable proof of authenticity.

The authenticated, digitally signed and/or encrypted documents are stored by the third-party Authentication Center in any convenient form, such as on optical and/or magnetic disks. Once a transaction is completed and the digitally signed and/or encrypted document or documents are transmitted and authenticated by the Authentication Center, any authorized party can access the Authentication Center through an electronic device such as a modem to obtain or further transmit an authenticated document. All transmissions of electronic documents from the originator are made to the Authentication Center, which provides authentication as described above and stores the authenticated documents for transmission to and on behalf of authorized parties whose identities and policies are similarly authenticated by the Authentication Center. Authorization for access may be restricted to the level of a single document or group of documents.

In accordance with Applicant's invention, the DAS verifies and ensures that documents that have been transmitted, stored, or retrieved have not been accidentally or intentionally modified. The DAS can verify at any stage and at any time that a document is exactly, to the last bit, the document which was executed and transmitted by the originator and that the document has not been altered or impaired in any manner. This element of integrity combined with a digital signature and a date and time stamp enable the DAS to ensure that a document is not a fabrication, forgery, impersonation, or unauthorized replacement of a document originally executed or sealed by the document's originator.

Since originators of documents to be signed and/or encrypted, such as loan and mortgage documents, commercial paper and other securities, property deeds and leases, etc., should be able to execute their transactions from a variety of locations, the DAS moves the heart of the cryptographic process to a Token entrusted to a respective authorized Transfer Agent. This permits individual utilization of any DAS enabled computer in any location that is networked or connected with the Authentication Center. As described above, the cryptographic cards and certificates are issued and monitored by the Certification Authority. Certificates are further controlled through the inclusion of an "expiration period" field, which enables the periodic replacement if desired of the Transfer Agent certificates. It will be appreciated that certificates in accordance with X.509 include a plurality of such fields, but only those fields important to understanding the operation of the invention are described here.

FIG. 2 summarizes the functions of the DAS relating to document transmission authorization and protection. In the left column are the functions of a Transfer Agent's Token; in the center column are other functions carried out by the Transfer Agent's transmission device; and in the right column are functions of the DAS. FIG. 3 is a diagram illustrating interconnections among three Transfer Agent terminals and a server subsystem and backup subsystem in the Authentication Center in the DAS architecture. FIG. 4 is a block diagram of the functional interrelationship between a Transfer Agent and the Authentication Center.

The cryptographic card includes components, such as a microprocessor and electronic memory devices, for carrying out the steps of a PKC algorithm as well as a symmetric encryption algorithm such as DES. Also, the card should be tamper-proof, which can be assured by designing it to delete critical keys and/or algorithms upon any attempted penetration or alteration. The National Institute of Standards and Technology has been chartered to certify the authentication implementation of the cryptographic card suppliers that may be used by the DAS.

In accordance with Applicant's invention, each transaction and its documents are authenticated using a public key contained in the Transfer Agent's certificate. Privacy, signature, and/or integrity devices and software are commercially available from a number of sources, including RSA Data Security, Inc.; Public Key Partners; Surety Technologies, Inc.; Ascom Tech AG, Switzerland; National Semiconductor; Northern Telecom Ltd.; and Spyrus.

The Authentication Center makes use of its own secret key to sign again the transaction in a manner that cannot be repudiated. The combination of the Transfer Agent's and Authentication Center's signatures (in conjunction with the physically protected audit trail) can be used at a future date to prove conclusively that an agent, employee, or firm (the Transfer Agent) initiated a specific transaction. In addition, a Notary Public support function is available for implementation as described below.

Employee or agent sign-on at the Transfer Agent's terminal is protected by the personal identification information and the cryptographic features of the cryptographic card held by that Transfer Agent. The combination of these controls uniquely identifies the agent or employee, thereby enabling DAS. In addition, agent or employee authorization and attribute information may be stored in the certificates or Token memory in protected or sealed form as described above. The DAS uses this information in conjunction with the PIN to set privilege, access, volume and fund amount limits.

The DAS provides a distributed validation capability using a "signature" that cannot be repudiated. The strategy uses PKC to reduce the key management overhead and to provide a digital signature that cannot be repudiated for all documents and transactions. Encryption is used to provide confidentiality protection of the PIN and other transaction details as described above. These control functions of the DAS are summarized in FIG. 5.

Additionally, the DAS is compatible with the full range of modern distributed, and client/server transactional based applications. It operates effectively in LAN, WAN, and dial-up networks. The DAS preferably utilizes modern database tools, and thus the server can advantageously utilize relational technology with a SQL interface (e.g., SYBASE).

As illustrated in FIG. 4, the originator of an electronic document or other Transfer Agent may implement the DAS with a typical 486 desktop or laptop computer having the DAS encryption subsystem (Token) installed and optionally an electronic digital signature pad for hand-signed "execution" of the document. It is not required for the function of the DAS to have a hand-signed instrument since a digital signature on the document is sufficient. However, at this time, a typical party in loan or other commercial transactions requires the comfort of receiving laser-printed copies of documents which have been executed by hand. Other components and software typically provided in the Transfer Agent terminal are a communication subsystem for handling transmission of encrypted or digitally signed documents to the Authentication Center by a modem telephone line or other suitable communication link, a Token interface, a message handler, input/output interface, and multimessage input application.

The Authentication Center is advantageously organized as a server subsystem, a crypto backup subsystem, and storage. As part of the server subsystem, which may be implemented with a 486 computer running under a UNIX-type operating system, a terminal communication subsystem includes a multiport controller (see also FIG. 3) that handles communications with the Transfer Agent terminals. Also provided in the server subsystem are a cryptographic key management subsystem, a backup subsystem, a relational database management system, input/output (I/O), system administration, and audit subsystem. A Token and backup communication subsystem interfaces with the backup subsystem mentioned above that may be implemented as a 486 computer running under a DOS-type operating system. A storage communication subsystem interfaces with the document storage device or devices mentioned above.

The DAS also would permit a "Notary Public" type of secondary support function. This would permit a third party present at the document's execution to also have a cryptographic card which would "seal" the transaction for further verification that the parties executing or sealing the document to be signed were in fact the proper parties. This additional notary function is not required, but would assist in the further authentication of the identities of the parties.

Figure 6A:
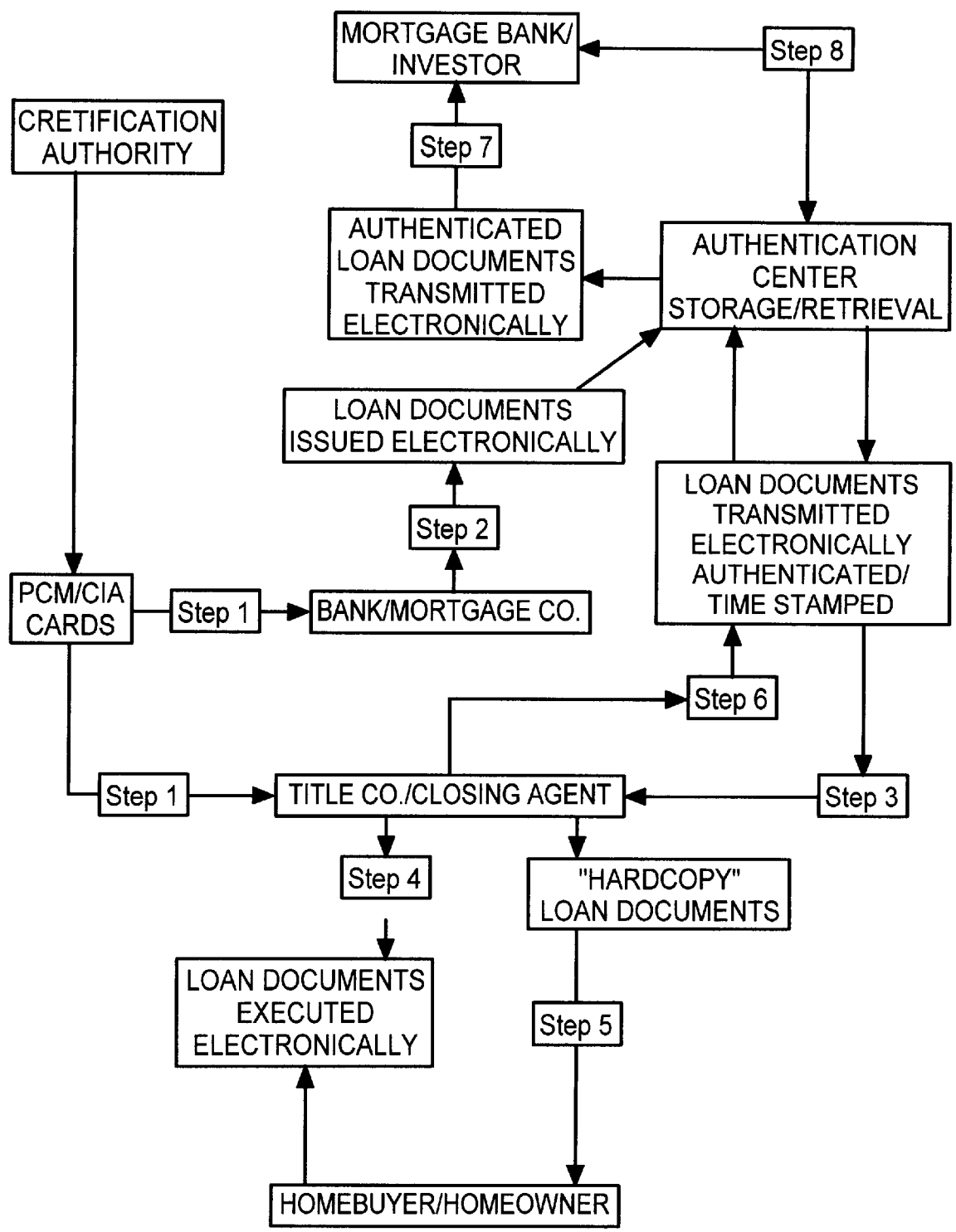

FIGS. 6a, 6b are diagrams illustrating a typical application of the DAS in the mortgage finance industry with a title company/closing agent for the loan as a Transfer Agent. In step 1, the Certification Authority completes code generation and issues Tokens to authorized parties for transferring documents and establishing legal evidence trails. The parties, who would generally not be individuals but commercial and financial institutions such as a BANK/Mortgage Co. and a Title Co./Closing Agent, would be equipped to transmit and receive documents electronically. In step 2, a Bank/Mortgage Co. loads and electronically transmits loan documents to the Authentication Center, which forwards them to a Title Co./Closing Agent after adding integrity blocks and date and time stamps. In step 3, the Authentication Center transmits the authenticated loan documents to the Title Co./Closing Agent.

In step 4, the Title Co./Closing Agent has the documents executed by digitized autograph signature by a Homebuyer/Homeowner. In step 5, the Title Co./Closing Agent provides Homeowner/Homebuyer with "hard copies" of the signed documents. In step 6, the Title Co./Closing Agent transmits the documents to the Authentication Center, which adds the integrity blocks and dates and time stamps the executed documents, forwards the documents to the Bank/Mortgage Co., and stores the documents. Whenever the Bank/Mortgage Co. needs copies of the authentic documents, they can be retrieved on-line from Authentication Center storage.

In step 7, the Bank/Mortgage Co. directs that the authentic documents be transferred by the Authentication Center to a secondary-market Mortgage Bank/Investor. In step 8, whenever the Investor needs authentic documents, they can be retrieved on-line from the Authentication Center.

Figure 7:
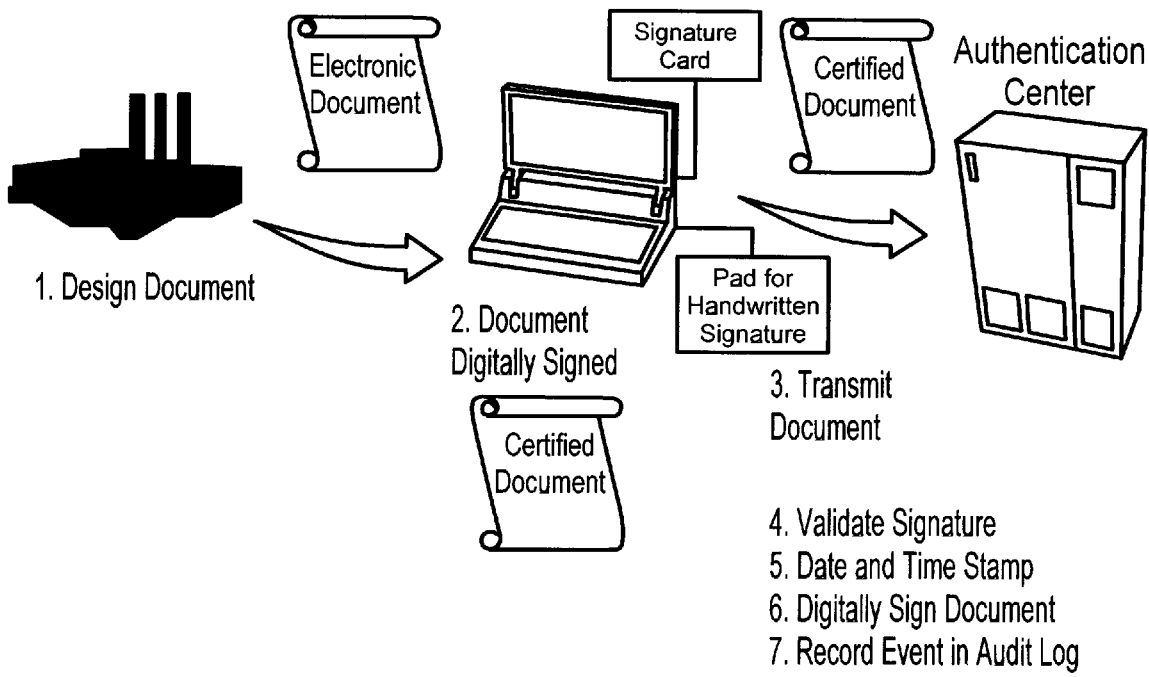
FIG. 7 illustrates the document certification process more generally.

FIG. 7 further illustrates an example of Applicant's document certification process. In the first step, an electronic document is designed, or drafted, that reflects the agreement of parties, such as a manufacturing operation depicted by the factory in FIG. 7. The electronic document is provided to a Transfer Agent's terminal, which is illustrated as a portable computer having an authorized Token and, optionally, a stylus pad for capturing hand-written signatures. A typical configuration for a Transfer Agent's terminal is at least the computational equivalent of a 386 desktop or laptop computer, with high resolution graphics, a PC Token reader, and a stylus pad for capturing hand-written signatures. As shown in FIG. 7, the electronic document, which may be created locally or remotely, is displayed on this terminal.

In the second step, the parties to the agreement execute their hand-written signatures on the document using the stylus pad. These signatures are captured and inserted in appropriate locations in the electronic document. After all parties have signed the document, the Transfer Agent certifies the completion of the document's execution by invoking his or her digital signature and appending his or her certificate, using the Token.

If an original paper document were desired, the electronic document would be printed first. The paper document would then be placed on the stylus pad and the terminal's cursor positioned to the corresponding place in the electronic document. This permits the capture and transfer of hand-written signatures during the actual signing of the paper document. The electronic version is then an exact duplicate of the paper document.

After local certification, the Transfer Agent transmits the electronic document to the Authentication Center in the third step of the process. The Authentication Center preferably includes a high-volume utility server computer, having substantial storage capacity and backup capability, and is a secure and highly assured facility. The Authentication Center contains a separate digital signature capability, one or more Tokens, and an accurate time base.

When an electronic document is received, the authenticity and rights of the Transfer Agent are validated by the Authentication Center (step 4). If authenticated, the electronic document is time- and date-stamped (step 5), digitally signed (step 6), journaled (step 7), and stored by the Authentication Center. Certified copies of the electronic document may then be distributed according to instructions from an appropriate party, such as the holder of a beneficial interest (owner) designated by the document.

The Authentication Center maintains the electronic document and a log, or history, of all transactions, such as requests for copies, etc., related to it. It will be appreciated that the log is useful for many management functions that contribute to the usefulness of the system. For example, the log facilitates identifying subsequent electronic submissions related to a transaction and contributes to liability limitation for the Authentication Center. Also, the log is useful as evidence of the document's chain of custody.

The Authentication Center also controls access to the document in accordance with authorization instructions provided by the owner of the document. Such authorization instructions would be updated or revised in conformance with changes (e.g., assignments) in the document's ownership.

Figure 8:
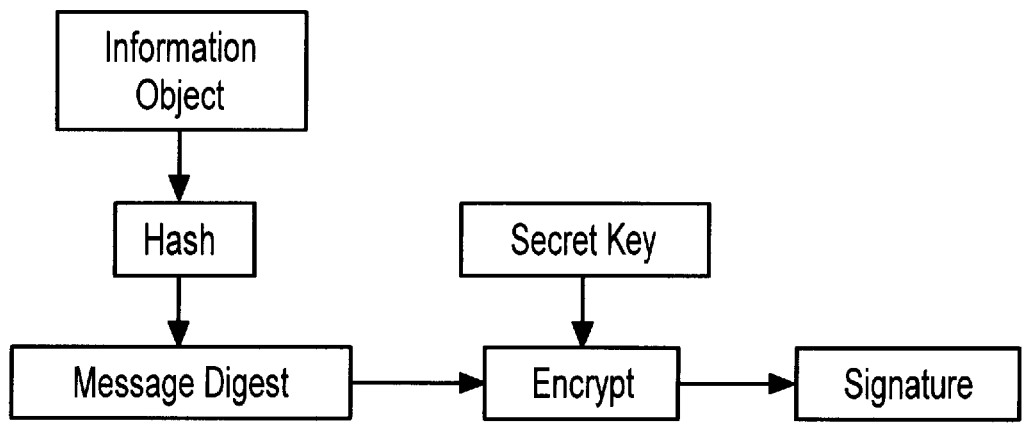
FIG. 8 illustrates generation of a digital signature.

FIG. 8 illustrates the process of digitally signing an electronic document, depicted more generally as an "information object", by application of a hash function. In general, a hash function is a truly one-way cryptographic function that is computed over the length of the information object to be protected. The hash function produces a "message digest" in a way such that no two different information objects produce the same message digest. Since a different message digest is produced if even one bit of the information object is changed, the hash function is a strong integrity check.

In accordance with the invention, the message digest is encrypted using the signatory's secret key, thereby producing the signatory's digital signature. The combination of hashing and encryption in this way insures the system's integrity (i.e., the ability to detect modification) and attribution capability (i.e., ability to identify a signatory, or responsible party). The digital signature (the encrypted message digest) is appended to the readable information object (see steps 2 and 6 depicted in FIG. 7).

Of the many different hash functions that are known, it is currently believed that those designated MD4 and MD5, which are embodied in circuits commercially available from vendors identified above, and the U.S. government's published secure hash algorithm are suitably robust for use in Applicant's DAS. Of course, other hash functions can be expected to become available as time passes.

Figures 9, 10:
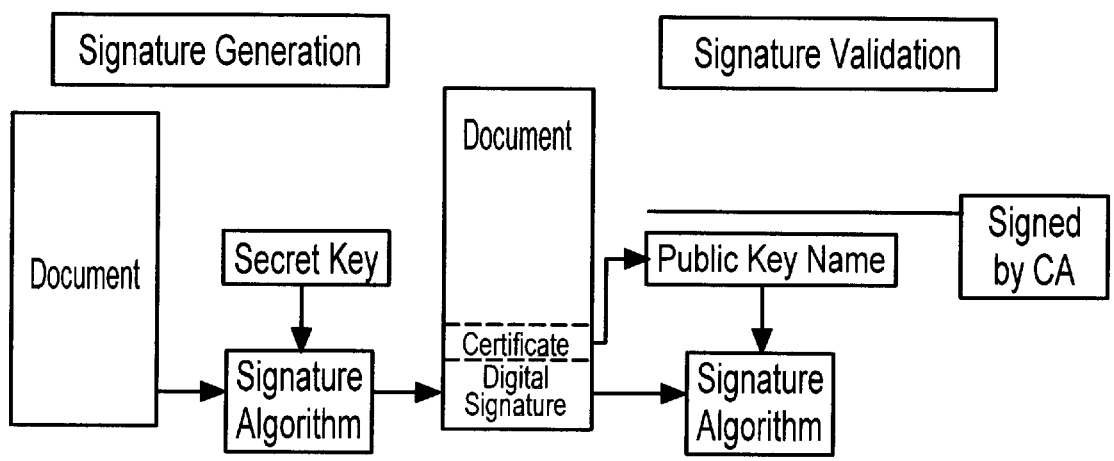
FIG. 9 illustrates digitally signing a document and validation of the digital signature.
FIG. 10 illustrates the format of a certificate employed by a user or the Certification Authority.

The steps of digitally signing an electronic document (steps 2 and 6 depicted in FIG. 7) and validating the digital signatures (step 4 in FIG. 7) are further illustrated in FIG. 9. The electronic document has appended to it one or more digital signatures, which are created by using a signature algorithm and the secret key(s) of the signatory(s) as described in connection with FIG. 8, and the certificate(s) of the signatory(s). As described above, each such certificate conveys the identity of the signatory, the signatory's public signature/verification key, predetermined collateral information about the signatory, and the digitally signed message digest of the certificate. The format of these pertinent parts of such a certificate in accordance with the X.509 Recommendation that would be employed by a user or the Certification Authority is illustrated in FIG. 10.

The signature validation step, which would normally but not necessarily be carried out by the Authentication Center, comprises decrypting the message digest appended to the document, re-hashing the document to generate another message digest, and comparing the resulting message digest to the decrypted message digest. The public signature/verification key found in the certificate signed by the Certification Authority and appended to the document is used for decrypting the appended message digest. If the two message digest values agree, the identity of the individual named in the certificate can be asserted as the signatory of the document, or other information object, and the integrity of the document is confirmed and guaranteed. An Authentication Center attests to this result by itself digitally signing the document.

Figure 11:
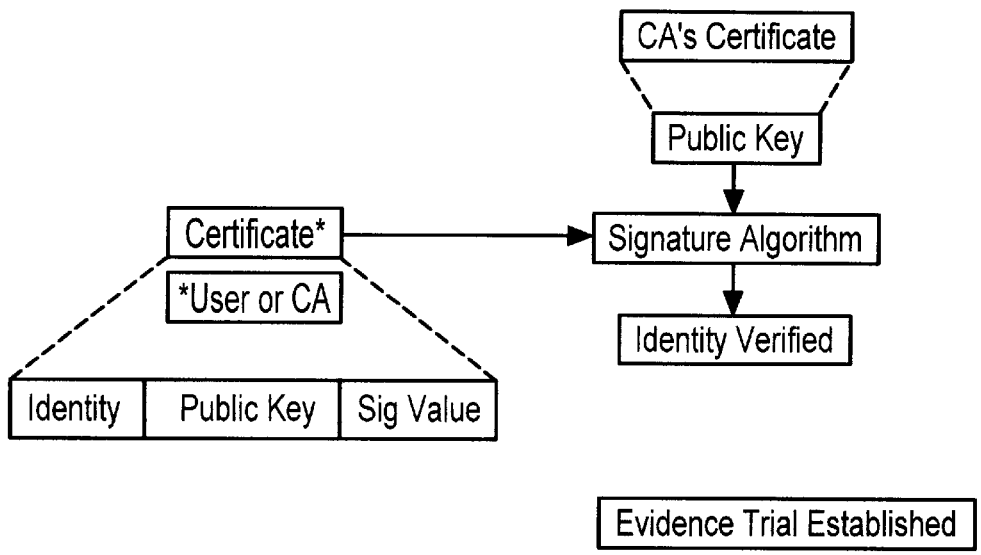
FIG. 11 illustrates validation of certificates.

As shown in FIG. 11, a certificate of a user (Transfer Agent) or even of a Certification Authority is preferably digitally signed in substantially the same way that electronic documents are digitally signed, except that such a certificate is signed by authorities specifically empowered to create certificates. Validation of a document's digital signatures includes validation of the public signatures of all Certification Authorities in a path between the signatory and a Root Authority, which is the most superior Certification Authority. The signatures of these Certification Authorities are loaded in the signatory's Token and appended to documents prepared with that Token.

Figure 12:
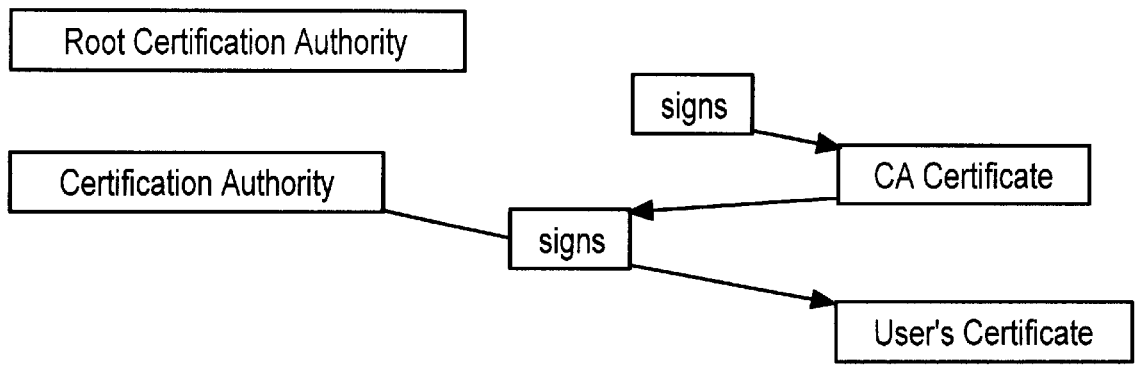
FIG. 12 illustrates generation of certificates.

As illustrated by FIG. 12, the path from the signatory to the Root Authority may be considered part of an authentication tree. The signatory's (user's) certificate is digitally signed by a Certification Authority whose own certificate (the CA Certificate) is signed by the Root Certification Authority. Since there is likely to be a plurality of Certification Authorities located on different branches of the authentication tree, it is only necessary to retrieve all Certification Authority certificates along both branches until a common node is encountered, in order to authenticate a digital signature for an entity on a different branch of an authentication tree, and to verify the authenticities of the certificates up to the common node.

It can be seen from the description above that Applicants' invention is useful in a wide variety of commercial and other transactions. For example, transfers of stored authenticated information objects according to suitable instructions can occur "internally" (without retrieving a stored object) or "externally" (by retrieving an object and providing it to another). Also, establishment of a verifiable evidence trail, or chain of custody, by date and time stamping an object, signing with another digital signature, appending another certificate, and storing the resulting object are described. Accordingly, Applicants' invention enables sales, assignments, and other ownership transfers of authenticated information objects, which may have intrinsic value, like electronic artistic works, as well as extrinsic value, like notes and securities.

It will be appreciated that Applicants' invention is not limited to such scenarios, however, but rather also enables a wide variety of transactions, including, for just one example, contract formation by an authenticated offer (an information object) that may be retrieved or distributed to one or more entities according to suitable instructions from the owner of the information object. An entity's acceptance or counter-offer, as well as a final agreement, can be information objects that would be subsequently received in relation to the transaction of contract formation. It may be noted that the originator of an information object may be the entity that digitally signs and appends a certificate to the information object.

Such scenarios benefit substantially from Applicants' systems and methods that implement PKC for the registration and transfer of ownership of stored original authenticated electronic records or objects. A trusted third party, the Authentication Center, performs the storage, custodial, and registry functions for the benefit of the owner of the electronic record. Applicants' systems and methods make it possible to establish ownership of electronic records, and to provide irrefutable proof when a transfer of ownership takes place. This supports stranger-to-stranger transfers, which in the following example involves three steps (an offer, an acceptance, and a record of transfer) that are independently performed by the offer's owner, the offer's recipient, and the trusted third party, respectively. In accordance with Applicants' invention, a document's current owner, the owner's offer to one or more potential buyers, and the acceptance of the offer by a buyer(s) are identified, and a chronicle evidencing the transfer is created. From this example, the withdrawal of an offer anytime prior to its acceptance and the transfer of the record can also be seen.

To begin this example which is illustrated in FIG. 13, an information object, be it a document, negotiable instrument, or other valuated object, would be under the control of the Authentication Center, and a first party wishes to transfer the authenticated object to a second party. The first party would propose to transfer the authenticated object to the second party by retrieving the authenticated object from the trusted repository (step 1301), attaching instructions to the authenticated object (step 1303), and transmitting the object and instructions/terms of transfer to the second party by a secure transmission means. Traditional paper transfers would use transmission means (step 1305) such as a courier or registered mail. Since the information object in this example is electronic and is protected by the methods and apparatus described in this application, secure electronic means could be used to transmit the object and its instructions; for example, these electronic means could include the first party's applying a digital signature to the authenticated object and the associated instructions.

The second party would receive the transmitted authenticated object and instructions (step 1307), and might decide to accept the offer. The second party could then present the accepted offer/object and instructions to the Authentication Center (trusted repository) (step 1309), which would effect transfer of ownership of the document as instructed (step 1311). Alternatively, the second party could communicate its acceptance of the offer to the first party, who would then transfer this acceptance in the form of instructions to the repository to assign ownership of the object to the second party (step 1313). In either case, the actual transfer or assignment of ownership would occur at the trusted repository, which would validate the digital signature of the new owner (the second party) on object, apply a date and time stamp, and sign all of this with its own digital signature. Of course, the terms of transfer from the first party to the second party (instructions) might provide for rescission of the offer by the first party at any time or subsequent to a specified time, in which case the first party could rescind the offer by instructing the repository to assign ownership of the object to the first party itself, in effect simply replacing the first party's prior ownership with a "new" ownership by the first party.

The preceding example can be expressed more economically for the symbolically inclined as follows:

| | |
|---|---|
| Offer from B to C | $S_b(S'_{TR}(S_b(S_a(Object))), Cert_c, Qual)$ |
| Acceptance C to TR | $S_c(S_a(Object)), S_b(S'_{TR}(S_b(S_a(Object)))), Cert_c, Qual)$ |
| Alternative acceptance | $S_c(S_c(S_a(Object)), S_b(S'_{TR}(S_b(S_a(Object)))), Cert_c, Qual))$ |
| Transfer by TR to B&C | $S'_{TR}(S_c(S_a(Object)))$ | where (Object) is, e.g., a document, fax, graphic, certificate, promissory note, etc.; Cert is irrefutable proof of user identity when used with secret key (e.g., an X.509 certificate); TR is the Trusted Repository, which is the object record keeper and registry, controlling the object on behalf of the object's owner; $S_a$ is the originator of a secured object; $S_b$ is the first party to obtain ownership of the secured object; $S_c$ is the second party, potential new owner of the secured object; S is a digital signature; S' is the digital signature and time stamp of the TR; $S_a(Object)$ is the object signed by A; $S_b(S_a(Object))$ is the authenticated (secured) object; $S'_{TR}(S_b(S_a(Object)))$ is the authenticated object stored by TR; and Qual represents the qualifications or instructions on the offer that may govern TR's actions (e.g., accept the first received response, accept the highest response, accept a response greater than an amount, response closing date). For counter-offers, Qual might take the form of, for example, accept contingent on, after date, bid, etc.

The signed object $S_a(Object)$ is created by $S_a$, the ownership of which by $S_b$ is denoted by $S_b(S_a(Object))$. $S_b$ sends the signed object to TR, which creates $S'_{TR}(S_b(S_a(Object)))$, the authenticated object. The TR records, registers, and controls $S'_{TR}(S_b(S_a(Object)))$, which becomes the responsibility of the TR. $S_b$ makes the offer to $S_c$, which is denoted $S_b(S'_{TR}(S_b(S_a(Object))), Cert_c, Qual)$, where the inclusion of Cert indicates intended recipient(s) of the offer and the inclusion of the instructions Qual defines terms that must be enforced by the TR. $S_c$ accepts the offer by re-signing $S_a(Object)$, thereby creating $S_c(S_a(Object))$, which with $S_b(S'_{TR}(S_b(S_a(Object))), Cert_c, Qual))$ is transmitted to the TR to initiate transfer of ownership. The TR validates the offer and determines if the Qual is satisfied. If both actions check, the TR time-stamps and signs the offer and acceptance, effecting the transfer by creating $S'_{TR}(S_c(S_a(Object)))$, and for audit purposes the TR creates $S'_{TR}(S_b(S'_{TR}(S_b(S_a(Object)))), Cert_c, Qual))$. The TR records, registers, and controls $S'_{TR}(S_b(S'_{TR}(S_b(S_a(Object)))), Cert_c, Qual))$ and $S'_{TR}(S_c(S_a(Object)))$. Transfer is completed and acknowledged by transmitting $S'_{TR}(S_c(S_a(Object)))$ to both $S_b$ & $S_c$.

The rescission of an offer can be expressed symbolically as follows:

$S_b$ rescinds offer B to TR $S_b(S_a(Object)), S_b(S'_{TR}(S_b(S_a(Object)))), Cert_b, Qual)$ and multiple offers B to C, D, etc. can be expressed symbolically as:

$S_b(S_a(Object)), S_b(S'_{TR}(S_b(S_a(Object)))), Cert_c, Cert_d, Qual)$ and counter offers C to B can be expressed as:

$S_c(S_b(S'_{TR}(S_b(S_a(Object)))), Cert_c, Qual), Counter Offer)$

The preceding example that has been presented in words and in symbols is just one of many specific applications of Applicants' invention that each have their own particular advantages. It will be understood, for example, that transactions involving a plurality of strangers, e.g., a stranger-to-stranger-to-stranger transfer can easily be carried out by sequentially repeating the preceding example, once for each pair of strangers.

It will also be understood that the instructions can direct a transaction along many different paths and that instructions may come from a variety of entities, including the owner of an information object, an owner-designated custodian of an information object, or another agent. Instructions may be tiered by an electronic agent, which is generally understood to be a computer program or other automated process that can interpret instructions and act on them for a predictable end. Tiered instructions would have levels of response and decision making, such as if X (a second party) does not respond to an offer within a specified time period, then transmit the offer to Y (another second party), and if Y does not respond within another specified time period, then return the offer to the offeror (the first party).

For example, the instructions can permit a second party to accept some (or all) of a set of authenticated information objects, such as a set of titles to a fleet of vehicles, or to accept specified portions of one or more objects in the set. Applicants' invention thus can provide asset- or risk-sharing or other forms of syndicated transactions; the instructions would permit other second parties to accept some or all of the remaining object or objects. This form of transaction might be useful in contexts, such as re-insurance, where it is desirable for one party, such as a primary insurer, to spread the cost or risk associated with an information object among several other parties, such as one or more re-insurers. Similarly, the instructions could permit a second party to "oversubscribe" to a first party's offer when the first party had one or more other "first parties" willing to provide the amount of the oversubscription. This form of transaction also might be useful in cost/risk management contexts like insurance, where a second party seeks to accept an object "greater" than the object offered by the first party.

The features of the trusted repository that are described above permit the execution of transactions with the advantages of Applicants' invention. One form of trusted repository that is currently believed to be particularly advantageous may be called a "Trusted Custodial Utility". Such a Trusted Custodial Utility ("TCU") implements defined business rules for the transactions handled by the TCU (i.e., a complete set of authorized actions). The TCU also implements a defined security policy (i.e., a set of protective measures that is necessary to prevent unauthorized actions). The TCU uses its business rules and security policy to govern transaction requests and access to the repository over the life cycle of all documents within its control, verifying the identities and authorities of parties (local and remote) requesting repository services. The TCU securely stores and securely retrieves digitally signed, authenticated, and encrypted electronic documents or information objects. Upon request, the TCU prints and issues certified documents.

The TCU advantageously supports a multi-port token server for proving document authenticity, for verifying the identities of signing parties, and for authenticating (date- and time-stamping, and resealing) document submissions. The TCU provides for backup and disaster recovery, and ensures that stored information is not lost within a specified retention period, whether that period is specified by a user, law, or regulation.

As described above, Applicants' invention provides for a verifiable chain of custody that can be useful for many purposes besides simply indicating the provenance or pedigree of a document or object. For example, governmental entities might use a chain of custody to help compute and collect taxes or other levies. The TCU provides such an evidence trail by receiving an original executed or signed document and verifying the identity of the signer and the authenticity of documents received. The TCU retrieves certificate revocation lists ("CRL's") from a directory, checks the CRL for Certificate validity, and checks the expiration date of the Certificate. The TCU then generates date and time stamps for the document received, and provides an integrity block that ensures that the document cannot be altered without detection. The integrity block is provided using a digital signature algorithm to provide for non-repudiation, i.e., the ability to prove the identity of the document's originator and the identity of the authentication center. The evidence trail uses the integrity block and date and time stamps to provide notice and evidence of any alteration efforts, even by a document's originator, if alteration is attempted after origination.

As noted above, certified documents advantageously can be printed or otherwise reduced to "hard copy" and issued by the trusted repository in response to a suitable instruction. It is currently believed to be preferable for the repository to apply to the hard copy some form of indicium or legend that is resistant to forgery or unauthorized imitation, such as a watermark, hologram, or similar, that would signify the repository's "certification" of the document. This is one way in which a user could withdraw its records from the repository, whether permanently or temporarily.

It will be noted that the present description and drawings are illustrative only and that one of ordinary skill in the art would recognize that various modifications could be made without departing from the spirit or scope of the present invention which is to be limited only by the following claims. This application hereby incorporates by reference U.S. Pat. No. 5,748,738 to Bisbee et al. and U.S. Pat. No. 5,615,268 to Bisbee et al.

What is claimed is:

1. A method of executing a transaction by transferring authenticated information objects having respective verifiable evidence trails, comprising the steps of:

retrieving, by a first party from a trusted repository, an authenticated information object, wherein the authenticated information object includes a first digital signature of the first party, a first certificate relating at least an identity and a cryptographic key to the first party, date and time stamps and a second certificate applied by the trusted repository, and a digital signature of the trusted repository; the first digital signature and first certificate have been validated by the trusted repository; the second certificate relates at least an identity and a cryptographic key to the trusted repository; and the authenticated information object has been stored under the control of the trusted repository;

attaching instructions to a retrieved authenticated object;

transmitting the retrieved authenticated object and the attached instructions to a second party;

receiving, by the second party, a transmitted retrieved authenticated object and attached instructions;

presenting, by the second party to the trusted repository, a received transmitted retrieved authenticated object and attached instructions; and executing the transaction according to the instructions presented to the trusted repository.

2. The method of claim 1, wherein the instructions cause the trusted repository to transfer ownership of the authenticated information object from the first party to the second party.

3. The method of claim 2, wherein the trusted repository validates a digital signature of the second party included with the presented object, applies date and time stamps to the presented object, and signs the stamped presented object with its digital signature.

4. The method of claim 2, wherein the transfer of ownership of the authenticated information object includes formation of a second authenticated information object for evidencing payment in a verifiable evidence trail in a registry.

5. The method of claim 1, further comprising the step of transmitting the retrieved authenticated object and the attached instructions by the trusted repository to each of a plurality of second parties in accordance with the attached instructions.

6. The method of claim 5, wherein the attached instructions cause the trusted repository to take at least one of the following actions: accept a first-received response, accept a greatest-value response, accept a response greater than an amount, and accept a response presented before a closing date.

7. The method of claim 1, wherein the instructions provide a syndicated transaction.

8. The method of claim 7, wherein the syndicated transaction relates to a set of authenticated information objects, the instructions permit at least one second party to accept at least one authenticated information object in the set, and ownership of authenticated information objects not accepted by the at least one second party is retained by the first party.

9. The method of claim 8, wherein acceptance by the at least one second party transfers to the at least one second party rights to a revenue stream and a corresponding default risk.

10. The method of claim 1, wherein the first party applies a digital signature to the retrieved authenticated object and the instructions before they are transmitted to the second party.

11. The method of claim 1, wherein the executing step comprises the steps of:

extracting instructions presented to the trusted repository from the received transmitted retrieved authenticated object and attached instructions;

interpreting extracted instructions to determine at least one term of the transaction; and enforcing the at least one term in executing the transaction.

12. The method of claim 11, wherein the instruction conveys a term-of-use of the retrieved authenticated information object.

13. The method of claim 11, wherein the instruction authorizes the trusted repository to transfer a restricted right of ownership in the retrieved authenticated information object.

14. The method of claim 13, wherein the retrieved authenticated information object is at least one of a limited edition of information objects and has respective identification information.

15. The method of claim 14, wherein the instruction includes a term that conveys a purpose for creating a limited edition and a term that includes a restriction enforced when the object is accessed.

16. The method of claim 11, wherein the instruction causes to be performed an action of displaying an authenticated name conveyed in a certificate with an authenticated information object.

17. The method of claim 16, where the authenticated information object includes at least one digital signature.

18. The method of claim 1, wherein the instructions cause the trusted repository to transfer control of the authenticated information object from the trusted repository to a second trusted repository.

19. The method of claim 1, wherein the instructions cause the trusted repository to transfer possession of the authenticated information object to a second trusted repository.

20. The method of claim 1, wherein the trusted repository implements a subscriber-based membership system governing the granting of access authorization to an authenticated information object based on established assurance levels in identifying certificate holders and in business rule enforcement.

21. The method of claim 1, wherein the first party applies a digital signature to the retrieved authenticated object and the instructions before the second party presents the object and instructions to the trusted repository, thereby terminating further execution of the transaction.

22. The method of claim 1, wherein the second party presents further instructions to the trusted repository, and the second party digitally signs and applies a third certificate to the presented object and instructions.

23. The method of claim 22, further comprising the step of communicating, from the first party to the second party after the trusted repository receives the presented object and instructions, a response that includes the first digital signature and the first certificate.

24. The method of claim 23, wherein the first party and second party each communicate a plurality of responses before the transaction is executed.

25. A method of executing a transaction by transferring authenticated information objects having respective verifiable evidence trails, comprising the steps of:

retrieving, by a first party from a trusted repository, an authenticated information object, wherein the authenticated information object includes a first digital signature of the first party, a first certificate relating at least an identity and a cryptographic key to the first party, date and time stamps and a second certificate applied by the trusted repository, and a digital signature of the trusted repository; the first digital signature and first certificate have been validated by the trusted repository; the second certificate relates at least an identity and a cryptographic key to the trusted repository; and the authenticated information object has been stored under the control of the trusted repository;

attaching first instructions to a retrieved authenticated object;

transmitting the retrieved authenticated object and the first instructions to a second party;

receiving, by the second party, a transmitted retrieved authenticated object and first instructions;

communicating, by the second party to the first party, a response to a received transmitted retrieved authenticated object and first instructions;

sending second instructions from the first party to the trusted repository; and executing the transaction according to the second instructions.

26. The method of claim 25, wherein the instructions cause the trusted repository to transfer ownership of the authenticated information object from the first party to the second party.

27. The method of claim 26, wherein the transfer of ownership of the authenticated information object includes formation of a second authenticated information object for evidencing payment in a verifiable evidence trail in a registry.

28. The method of claim 25, wherein the first party applies a digital signature to the retrieved authenticated object and the instructions before they are transmitted to the second party.

29. The method of claim 25, wherein the first and second instructions provide a syndicated transaction.

30. The method of claim 29, wherein the syndicated transaction relates to a set of authenticated information objects, the first instructions permit at least one second party to accept at least one authenticated information object in the set, and ownership of authenticated information objects not accepted by the at least one second party is retained by the first party.

31. The method of claim 30, wherein acceptance by the at least one second party transfers to the at least one second party rights to a revenue stream and a corresponding default risk.

32. The method of claim 25, wherein the instructions cause the trusted repository to transfer control of the authenticated information object from the trusted repository to a second trusted repository.

33. The method of claim 25, wherein the instructions cause the trusted repository to transfer possession of the authenticated information object to a second trusted repository.

34. The method of claim 25, wherein the trusted repository implements a subscriber-based membership system governing the granting of access authorization to an authenticated information object based on established assurance levels in identifying certificate holders and in business rule enforcement.

35. The method of claim 25, wherein the second party's response includes third instructions, and the second party digitally signs and applies a third certificate to the response.

36. The method of claim 35, further comprising the step of communicating, from the first party to the second party after the first party receives the response, a second response that includes the first digital signature and the first certificate.

37. The method of claim 36, wherein the first party and second party each communicate a plurality of responses before the first party sends the second instructions to the trusted repository.

38. The method of claim 25, wherein the first party applies a digital signature to the retrieved authenticated object and the instruction before a response is received by the trusted repository from the second party, thereby terminating further execution of the transaction.

39. The method of claim 25, wherein the executing step comprises the steps of:

extracting instructions from presented received transmitted retrieved authenticated object and attached instructions;

interpreting extracted instructions to determine at least one term of the transaction; and enforcing the at least one term in executing the transaction.

40. The method of claim 39, wherein the instructions authorize the trusted repository to transfer a restricted right of ownership in the retrieved authenticated information object.

41. The method of claim 40, wherein the retrieved authenticated information object is at least one of a limited edition of information objects and has respective identification information.

42. The method of claim 41, wherein the instructions include a term that conveys a purpose for creating a limited edition and a term that includes a restriction enforced when the object is accessed.

43. The method of claim 39, wherein the instructions convey a term-of-use of the retrieved authenticated information object.

44. The method of claim 39, wherein the instructions cause to be performed an action of displaying an authenticated name conveyed in a certificate with an authenticated information object.

45. The method of claim 44, where the authenticated information object includes at least one digital signature.

46. A method of off-line executing a transaction by transferring at least one authenticated information object, instruction, and connection information for a verifiable evidence trail, comprising the steps of:

establishing a secure communication session between a second party and a trusted custodial utility (TCU);

retrieving, by the second party from the TCU, an authenticated information object and at least one instruction, wherein the authenticated information object and instruction include a first digital signature of a first party, a first certificate relating at least an identity and a cryptographic key to the first party, date and time stamps and a second certificate applied by the TCU, and a digital signature of the TCU; the first digital signature and first certificate have been validated by the TCU; the second certificate relates at least an identity and a cryptographic key to the TCU; and the authenticated information object has been stored under the control of the TCU;

displaying a retrieved authenticated information object;

using at least one retrieved instruction to control actions that the second party can perform on the retrieved authenticated information object;

adding, by the second party to the retrieved authenticated information object, an information object and a third digital signature of the second party and a third certificate relating at least an identity and a cryptographic key to the second party;

transmitting to the TCU at least the retrieved information object, added information object, third digital signature, and third certificate in accordance with the retrieved instructions.

* * * * *